United States Patent
Rzhanov

(10) Patent No.: US 11,112,241 B2
(45) Date of Patent: Sep. 7, 2021

(54) APPARATUS AND METHOD FOR FAULT-PROOF COLLECTION OF IMAGERY FOR UNDERWATER SURVEY

(71) Applicant: University of New Hampshire, Durham, NH (US)

(72) Inventor: Yuri Rzhanov, Nottingham, NH (US)

(73) Assignee: UNIVERSITY OF NEW HAMPSHIRE, Durham, NH (US)

( * ) Notice: Subject to any disclaimer, the term of this patent is extended or adjusted under 35 U.S.C. 154(b) by 0 days.

(21) Appl. No.: 16/667,390

(22) Filed: Oct. 29, 2019

(65) Prior Publication Data

US 2020/0132456 A1    Apr. 30, 2020

Related U.S. Application Data

(60) Provisional application No. 62/752,070, filed on Oct. 29, 2018.

(51) Int. Cl.
*G01C 11/02* (2006.01)
*G01S 17/89* (2020.01)
(Continued)

(52) U.S. Cl.
CPC ............ *G01C 11/025* (2013.01); *G01C 13/00* (2013.01); *G01S 17/89* (2013.01); *H04N 5/2253* (2013.01);
(Continued)

(58) Field of Classification Search
None
See application file for complete search history.

(56) References Cited

U.S. PATENT DOCUMENTS

| | | | | |
|---|---|---|---|---|
| 6,639,596 B1* | 10/2003 | Shum | .................... | G06K 9/209 345/427 |
| 8,220,408 B2* | 7/2012 | Stone | .................. | G01S 15/8922 114/312 |

(Continued)

OTHER PUBLICATIONS

N. R. Gracias, S. van der Zwaan, A. Bernardino and J. Santos-Victor, "Mosaic-based navigation for autonomous underwater vehicles," in IEEE Journal of Oceanic Engineering, vol. 28, No. 4, pp. 609-624, Oct. 2003, doi: 10.1109/JOE.2003.819156. (Year: 2003).*

(Continued)

*Primary Examiner* — Rebecca A Volentine
(74) *Attorney, Agent, or Firm* — Finch & Maloney PLLC

(57) ABSTRACT

An apparatus and method are presented comprising one or more sensors or cameras configured to rotate about a central motor. In some examples, the motor is configured to travel at a constant linear speed while the one or more cameras face downward and collect a set of images in a predetermined region of interest. The apparatus and method are configured for image acquisition with non-sequential image overlap. The apparatus and method are configured to eliminate gaps in image detection for fault-proof collection of imagery for an underwater survey. In some examples, long baseline (LBL) is utilized for mapping detected images to a location. In some examples, ultra-short baseline (USBL) is utilized for mapping detected images to a location. The apparatus and method are configured to utilize a simultaneous localization and mapping (SLAM) approach.

23 Claims, 12 Drawing Sheets

(51) Int. Cl.
*H04N 7/18* (2006.01)
*H04N 5/225* (2006.01)
*H04N 5/232* (2006.01)
*G01C 13/00* (2006.01)

(52) U.S. Cl.
CPC ......... H04N 5/23299 (2018.08); H04N 7/181 (2013.01)

(56) References Cited

U.S. PATENT DOCUMENTS

| | | | | |
|---|---|---|---|---|
| 2015/0002621 | A1* | 1/2015 | Ratner | H04N 5/23238 348/36 |
| 2015/0363914 | A1* | 12/2015 | Boyle | G06F 16/58 345/629 |
| 2016/0198074 | A1* | 7/2016 | Boyle | H04N 5/2251 348/81 |
| 2018/0251199 | A1* | 9/2018 | Radford | B25J 9/0087 |

OTHER PUBLICATIONS

S.D. Ackerman et al., "Creating GeoTIFF Photo Mosaics from Seafloor Video", Abstract for GeoTools Conference, Mar. 2009, 1 page.
Josep Aulinas et al., "The SLAM Problem: A Survey", 9 pages.
Thibaut Barreyre et al., "Structure, Temporal Evolution, and Heat Flux Estimates from the Lucky Strike Deep-Sea Hydrothermal Field Derived from Seafloor Image Mosaics", Geochemistry Geophysics Geosystems, Apr. 19, 2012, 29 pages, vol. 13, No. 4.
JHR Burns et al., "Integrating Structure-From-Motion Photogrammetry with Geospatial Software as a Novel Technique for Quantifying 3D Ecological Characteristics of Coral Reefs", PeerJ, Jul. 7, 2015, 19 pages.
M. Elizabeth Clarke et al., "Developing the SeaBED AUV as a Tool for Conducting Routine Surveys of Fish and Their Habitat in the Pacific", IEEE, 2010, 5 pages.
B. Gintert et al., "Underwater Landscape Mosaics: A Unique Tool for Linking Reef Ecology and Reef Mapping", Strategic Environmental Research and Development Program, 2010, 1 page.

Raymond E. Grizzle et al., "Effects of a Large Fishing Closure on Benthic Communities in the Western Gulf of Maine: Recovery from the Effects of Gillnets and Otter Trawls", Fishery Bulletin, 2009, 107, pp. 308-317.
Jon Henderson, "Mapping Submerged Archaeological Sites Using Stereo-Vision Photogrammetry", The International Journal of Nautical Archaeology, 2013, pp. 243-256.
Jun Zhou et al., "Computer Vision and Pattern Recognition in Environmental Informatics", Advances in Environmental Engineering and Green Technologies (AEEGT) Book Series, 2016, 21 pages.
F. Liarokapis et al., "3D Modelling and Mapping for Virtual Exploration of Underwater Archaeology Assets", The International Archives of the Photogrammetry, Remote Sensing and Spatial Information Sciences, Mar. 1-3, 2017, pp. 425-431.
John McCarthy et al., "Multi-Image Photogrammetry for Underwater Archaeological Site Recording: An Accessible, Diver-Based Approach", J Mari Arch, 2014, pp. 95-114.
Oscar Pizarro et al., "Towards Large Area Mosaicing for Underwater Scientific Applications", Deep Submergence Laboratory, MS 7, 39 pages.
R. Pamela Reid et al., "Final Report: Application of Landscape Mosaic Technology to Complement Coral Reef Resource Mapping and Monitoring", Oct. 2010, 189 pages.
Y. Rzhanov et al., "Deep-Sea Image Processing", Center for Coastal and Ocean Mapping, UNH, 6 pages.
Y. Rzhanov et al., "Deep-Sea Geo-Referenced Video Mosaics", 6 pages.
Aleksej Saskov et al., "Usage of Videomosaic for Computed Aided Analysis of North Sea Hard Bottom Underwater Video for Baseline Study of Offshore Windmill Park", Coastal Research and Planning Institute, 2012, 1 page.
Aleksej Saskov et al., "Comparison of Manual and Semi-Automatic Underwater Imagery Analyses for Monitoring of Benthic Hard-Bottom Organisms at Offshore Renewable Energy Installations", Hydrobiologia, Oct. 2014, 15 pages.
Richard Taylor et al., "Evolution of a Benthic Imaging System From a Towed Camera to an Automated Habitat Characterization System", IEEE, 2008, 7 pages.
Bill Triggs et al., "Bundle-Adjustment—A Modern Synthesis", 71 pages.
Y. Rzhanov et al., "Senior-assisted Video Mapping of the Seafloor", Presented at the Oceans 2002 Conference on Oct. 31, 2002, published in Oceans '02 MTS/IEEE, 7 pages.

\* cited by examiner

APPARATUS AND METHOD FOR FAULT-PROOF COLLECTION OF IMAGERY FOR UNDERWATER SURVEY

CROSS-REFERENCE TO RELATED APPLICATIONS

This application claims benefit under 35 U.S.C. § 119(e) to U.S. Provisional Application Ser. No. 62/752,070, titled "APPARATUS AND METHOD FOR FAULT-PROOF COLLECTION OF IMAGERY FOR UNDERWATER SURVEY," filed on Oct. 29, 2018.

STATEMENT REGARDING FEDERALLY SPONSORED RESEARCH OR DEVELOPMENT

This invention was made with government support under National Oceanic and Atmospheric Administration (NOAA) grant number NA15NOS4000200. The government has certain rights in the invention.

TECHNICAL FIELD

The present invention relates to an apparatus and method for conducting underwater surveys, collection and processing of image and/or video data.

BACKGROUND

Underwater image and video surveys have become a common tool for researchers and commercial companies involved in cable and pipeline laying and inspection, building foundations for windfarms, and the like.

Researchers and experts have struggled to solve the SLAM problem in practical settings, at least in part because SLAM processes require a great deal of computational power to sense a sizable area and process the resulting data to both map and localize. A complete three-dimensional SLAM solution may be highly computationally intensive, for example, requiring complex real-time particle filters, sub-mapping strategies and/or hierarchical combination of metric topological representations.

SUMMARY

Examples of the present disclosure meet one or more of the above needs, among others, by providing a system and method for collecting images and/or video, collecting position information associated with the images and/or video, and preparing of a map of an unknown environment using a computer to analyze the collected information. The map may be a topological map. The map may capture the environment by combining images of pieces of the environment and connecting them in an appropriate way. The map may provide details with improved geometric accuracy when compared to conventional systems and methods. The system and method disclosed herein may provide guaranteed high overlap between frames. The system and method disclosed herein may provide fault-proof collection of imagery. The system and method disclosed herein may be configured to provide a 2-dimensional (2D) or 2.5-dimensional (2.5D) representation of a predetermined region of interest.

Accordingly, pursuant to one aspect, there is provided an apparatus for image collection, comprising an underwater vehicle, comprising a central motor comprising a rotating member, a set of arms couples to the rotating member and extending away from the central motor, and one or more cameras attached to a distal end of at least one arm of the set of arms, wherein the underwater vehicle is configured to travel over a predetermined region and collect a set of images of the predetermined region.

Examples described herein may be further characterized by one or any combination of features, such as a processor is configured to create a full mosaic image using non-sequential image overlap. In some examples, at least one of the central motor, a set of arms, and one or more cameras provided with rounded edges to facilitate hydrodynamic motion. In some examples, the set of arms is housed within a disc. In some examples, the underwater vehicle is configured to utilize a long baseline (LBL) approach to determine positioning for each imaged location in the predetermined region. In some examples, the underwater vehicle is configured to utilize an ultra-short baseline (USBL) approach to determine positioning for each imaged location in the predetermined region.

Pursuant to another aspect, an apparatus for collection of images is provided. The apparatus comprises an underwater vehicle comprising a motor; and a set of sensors configured to rotate about the motor. The underwater vehicle may be configured to travel over a linear path in a predetermined region and detect information in the predetermined region.

Examples described herein may be further characterized by one or any combination of features, such as the set of sensors being a set of time-of-flight (TOF) sensors. In some examples, bathymetry information is processed. In some examples, the set of sensors includes a set of cameras. In some examples, the set of cameras are rotated at a constant rotational speed. In some examples, at least one of the set of sensors and the motor are housed within a disc.

Pursuant to yet another aspect, a method is provided. The method includes acts of driving an underwater vehicle at a constant linear speed, rotating one or more cameras about a central motor, capturing a set of images of a region to be mapped, and detecting position of the underwater vehicle during image capture.

Examples described herein may be further characterized by one or any combination of features, such as the one or more cameras are coupled to a processor configured for image co-registration using non-sequential image overlap. In some examples, one or more cameras that are rotated at a constant rotational speed, utilization of a long baseline (LBL) approach to detect position of the underwater vehicle in the region to be mapped, and utilization of an ultra-short baseline (USBL) approach to detect position of the underwater vehicle in the region to be mapped. In some examples, the one or more cameras are configured to send the set of images to a computer, to perform a bundle adjustment step, to perform global optimization utilizing SLAM and non-sequential image overlap, and/or to compile the set of images into a map of the region.

Further aspects, advantages and areas of applicability will become apparent from the description provided herein. The description and specific examples are intended for purposes of illustration only and are not intended to limit the scope of the present disclosure.

DESCRIPTION OF THE DRAWINGS

The drawings described herein are for illustration purposes only and are not intended to limit the scope of the present disclosure in any way.

DETAILED DESCRIPTION

The following description provides one or more examples but is not intended to limit the present disclosure, application, or uses. The present disclosure describes an apparatus that is configured to avoid typical errors for surveys that follow standard protocols. Typical surveys may include image surveys, video surveys, and/or acoustic surveys.

Advantages of a video survey include fast coverage of large areas, high spatial resolution of the data (acoustic surveys, for example, yield much lower resolution), ease of interpretation, and non-invasiveness, as compared to sample collection. Sample collection, as used herein, may refer to acquisition of a single sample grab of sediment or several sample grabs. Although sample collection is considered to provide a ground truth, this method has a number of deficiencies. First, although a sampler is dropped from a known position using GPS, the sampler is not guaranteed to hit the seafloor directly vertically below the known position due to currents, for instance. As a result of the imprecise positioning, the sampler may not provide adequate information. For example, the sampler may hit the only boulder in the otherwise sandy area. Second, areas of bedrock cannot be sampled at all. Third, sample collection is an invasive technique that may damage the environment. All of these issues are solved by utilizing the fault-proof collection of imagery for underwater survey as described herein.

Video surveys may typically be performed by Remotely Operated Vehicles (ROV), Autonomous Underwater Vehicles (AUV), from towed platforms, or just by divers with handheld cameras. The expected output is a detailed map, much larger than a single camera footprint, often with height information (2.5D), and preferably tied to a geographic location.

As will be seen, the devices and methods taught herein offer an improved apparatus for capturing images using a Simultaneous Localization and Mapping (SLAM) approach. SLAM requires finding non-consecutive frames showing a previously-visited area of the seafloor. This process is known as a loop-closure, and it allows for update of prior information about a given trajectory. It is often a non-trivial task even for neighboring lines in the lawnmower pattern due to small overlap, slightly varying camera speed and altitude, and/or relatively featureless areas. In some simulations there is no better solution than the brute force approach—trying to match each frame with each.

Figure 1:
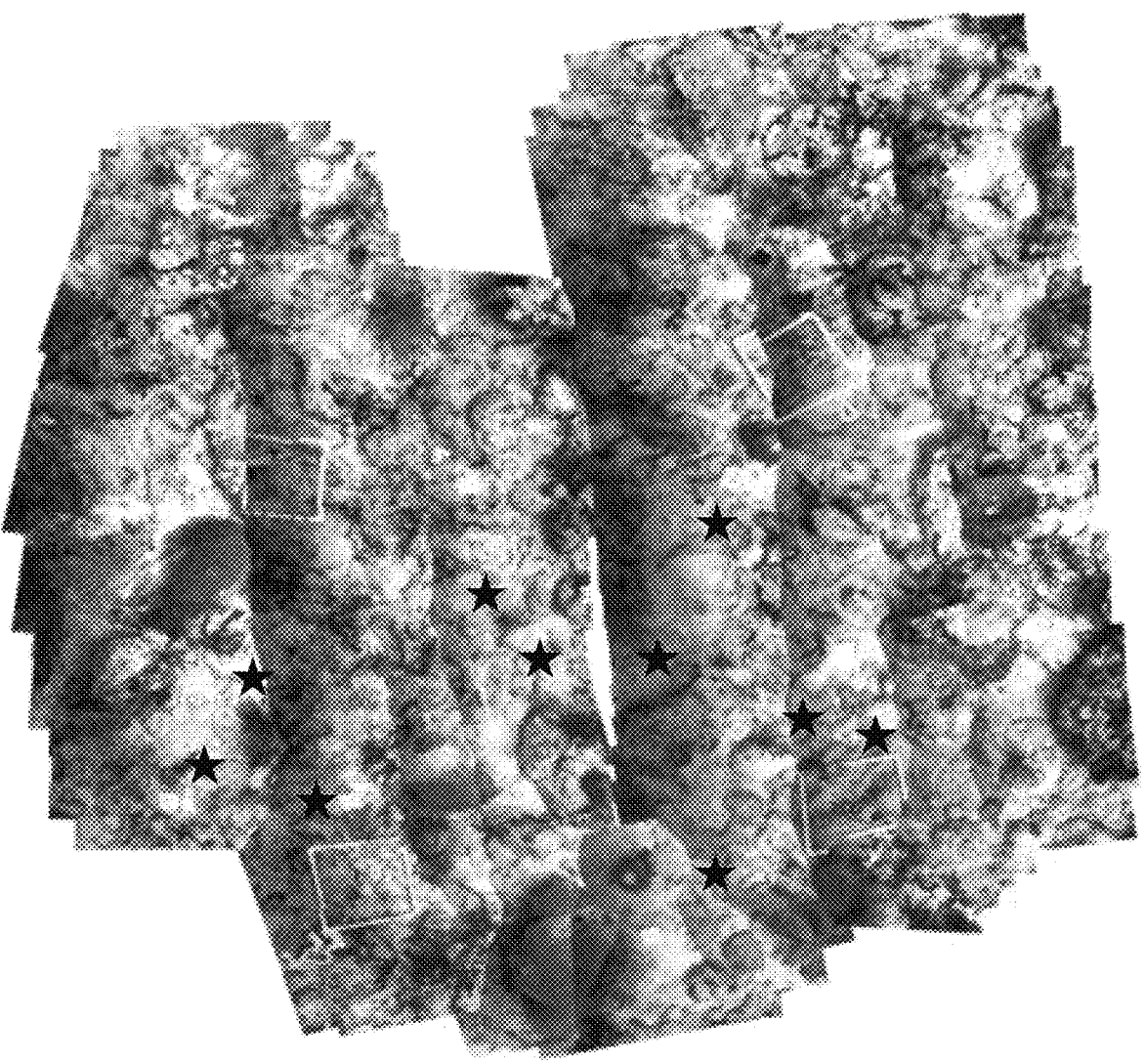
FIG. 1 is an image mosaic constructed from images collected in a lawnmower pattern, in one example of the disclosure.

FIG. 1 illustrates a survey organized in a lawnmower (or boustrophodonic) pattern with high overlap between successive frames (for video >95%) and reasonable (~>50%) overlap between neighboring runs. Image overlap is essential for construction of geometrically undistorted maps. Stars represent regions of poor overlap in the image reconstruction. The last processing step in the map construction is the bundle adjustment that allows for minimization of errors accumulating in the process of consecutive adding of frames to the map. The whole process of map building using this approach is often referred as SLAM.

Figure 2:
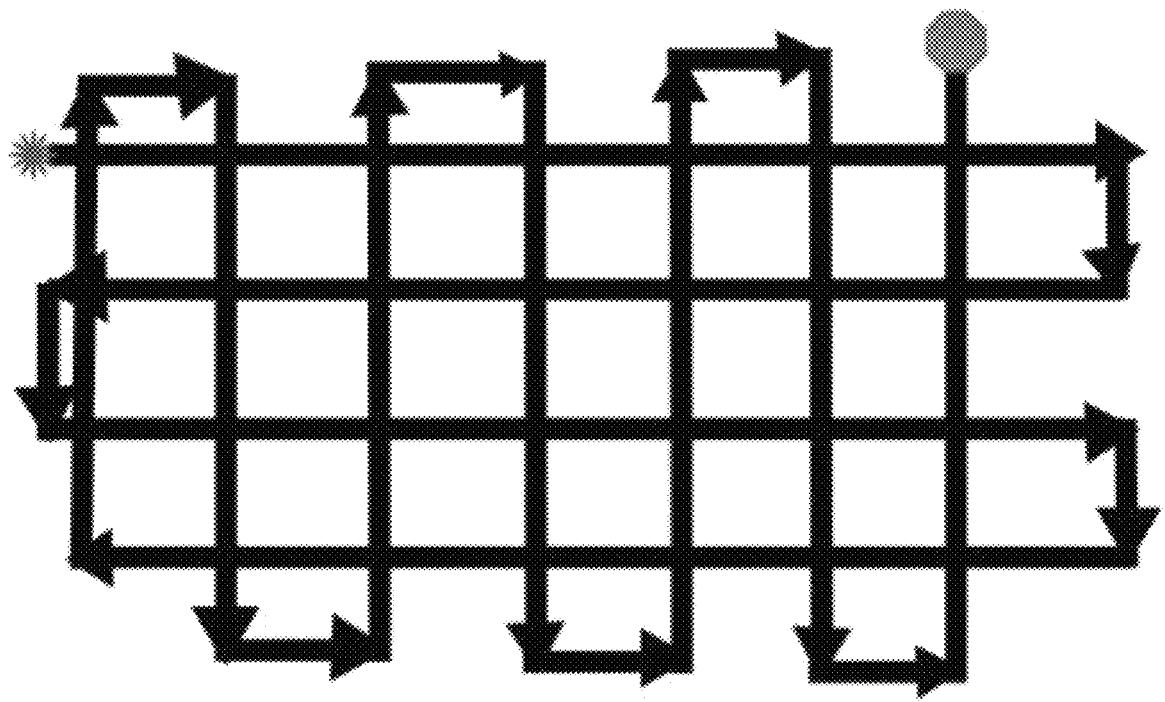
FIG. 2 is an image survey pattern, in one example of the disclosure.

FIG. 2 shows one example of supplementing the lawnmower pattern, which may be accomplished with a few crisscrossing lines or with a second similar pattern rotated with respect to the first to guarantee that collected data can be processed using SLAM techniques.

Without accurate positioning of the underwater system, even carefully planned surveys sometimes leave gaps or areas of insufficient non-consecutive overlap that introduce errors in resulting maps. To avoid such errors, some surveyors lay ropes or cables on the seafloor prior to data collection which significantly lengthens the time necessary for the survey. Even AUVs programmed to perform the survey mission can be thrown off course by a current not taken into account at the planning stage.

Figure 3:
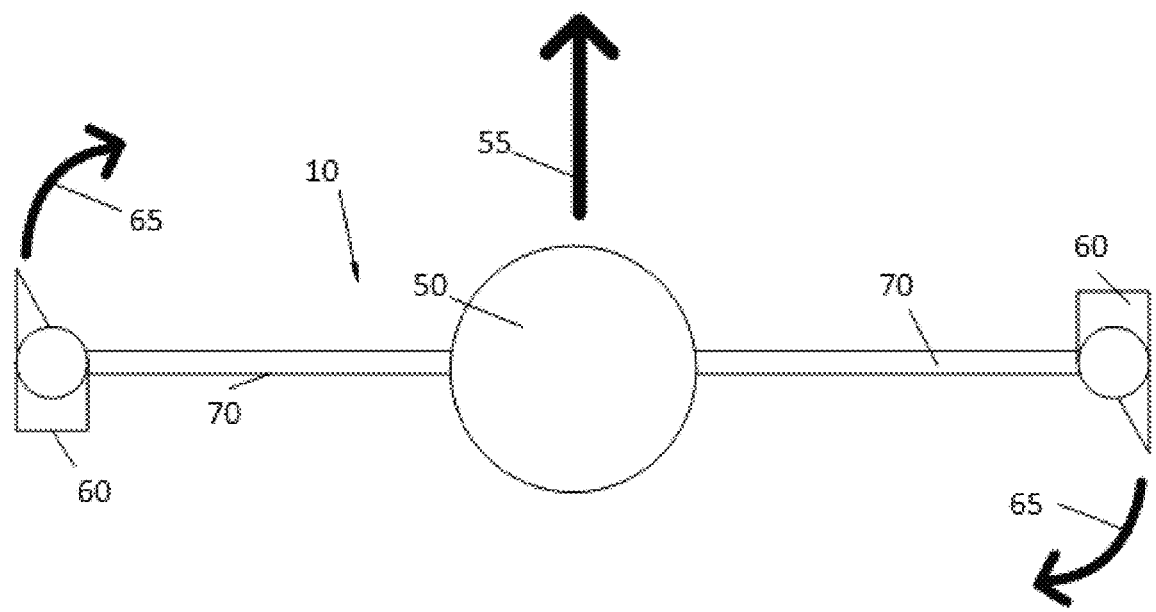
FIG. 3 is a top view of an example structure of the fault-proof image collection device, in one example of the disclosure.

As shown in FIG. 3, the apparatus 10 may include a central motor 50 surrounded by one or more cameras 60 configured to rotate in a direction 65 and capture image and/or video data of a predetermined region of interest. The footprint that may be accurately imaged may depend on a variety of factors. Factors to consider when determining an optimal configuration for image detection include camera speed, distance from camera 60 to imaged region, linear speed of the platform in a direction 55, image resolution achievable with a given camera 60. Other factors to consider may include if the camera has any tilt or if the imaged surface is rugged (i.e. not flat). For underwater applications, visibility underwater must also be considered; thus, for underwater applications the camera 60 or set of cameras 60 must be positioned relatively close to the seafloor. In some examples, the set of cameras 60 or set of sensors may be positioned between about 2 m, about 5 m, about 10 m, about 20 m, or more above the ocean floor. In some examples, the set of cameras 60 may be positioned between about 2 m and about 10 m above the ocean floor.

One example uses an underwater motor 50 with an arm 70 attached by its center to the motor shaft such that the arm 70 rotates in a plane parallel to the seafloor in a direction 65. In some examples, one or more cameras 60 are attached to the arms 70. One or more, two or more, three or more, five or more, or ten or more cameras 60 or sensors may be utilized for detection of a region of interest. In some examples, the one or more cameras 60 are positioned facing vertically down. In some examples, the one or more cameras 60 are positioned at an angle with respect to the seafloor. When the arms 70 rotate, the cameras 60 acquire images of the circle with the diameter equal to the length of the arms 70 and the size of the motor 50.

Figure 6:
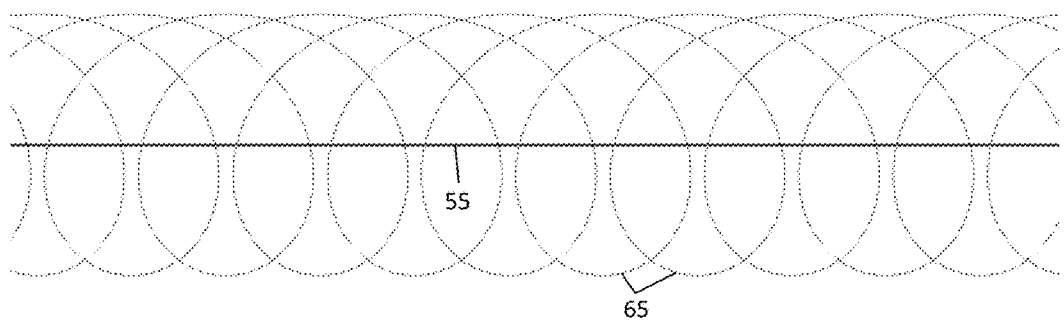
FIG. 6 is a top view of an example path of the motor (straight line) and an example path of a pair of cameras (curved lines), in one example of the disclosure.

When the motor drives forward moving in a straight-line direction 55 (linear motion, keeping constant altitude), the circle covered by the rotating cameras 60 also shifts covering new areas (FIG. 6). The imaged area depends on the size of the footprint of cameras 60, rotational speed of the arm 70, and linear speed of the apparatus 10. With relatively low linear speed, each area may be imaged at least twice—by both cameras 60. With relatively high linear speed, the camera 60 which is "currently ahead" of the motor may leave gaps which will be imaged by the "currently behind" camera 60. With even higher linear speed, some areas of the seafloor may not be imaged at certain rotational speeds; however, this problem may be alleviated by utilizing a higher rotational speed of the arm 70. Note, that most of the imaged area is covered by the forward facing and backward-facing sectors. However, the side areas (the furthest from the motor path) play an important role, as this is where the non-consecutive frames overlap occurs in a highly predictable manner. Every rotation cycle provides four guaranteed overlap areas—on entry and on exit of the previous rotation. Thus, knowledge of rotational speed and linear speed allows to foretell where non-sequential overlap occurs. Even without prior knowledge of the linear speed it is sufficient to find non-sequential overlap only once to predict the following occurrences.

Structurally, a set of cameras 60 is provided that are configured to rotate in a direction 65 about a central motor 50. As the motor 50 drives in a forward linear direction 55, the set of cameras 60 rotates about the central motor 50. FIG. 6 the trajectories taken by motor 50 in a linear direction 55 and the trajectories taken by cameras 60 in a rotational direction 65. In some examples, conventional cameras are used for image collection such as, for example, digital cameras, underwater cameras, digital SLR's, and/or compact digital cameras. In other examples, time-of-flight (TOF) cameras may be implemented for image collection. In some examples, the one or more cameras 60 are configured to look straight down during image collection. The set of cameras 60 may be oriented so that each camera 60 individually is directed in a downward direction, enabling imaging of the seafloor. Positioning each camera 60 facing downward is configured to allow for the creation of a flat mosaic during image reconstruction. An arrangement of the cameras 60 where the cameras 60 are downward facing may prevent or minimize oblique imaging. Oblique imaging may introduce challenges as far as isolating structure from motion. During image reconstruction, shapes may be reconstructed without having to isolate structure from motion if oblique imaging is prevented or minimized.

In some examples, it may be desirable to produce 2.5D image reconstructions using structure from motion. Structure from motion photogrammetry may provide hyperscale landform models using images acquired from a range of digital cameras and optionally a network of ground control points. Structure from motion photogrammetry may provide point cloud data. Structure from motion may be useful in remote or rugged environments where terrestrial laser scanning is limited by equipment portability and airborne laser scanning is limited by terrain roughness causing loss of data and image foreshortening. Structure from motion may be applied in many settings such as rivers, badlands, sandy coastlines, fault zones, and coral reef settings. Structure from motion photogrammetry may be configured to provide detailed surface topography in unprecedented detail, multi-temporal data, elevation detection, or detection of position and volumetric changes providing details on earth surface processes, for example. Structure from motion may include using data acquired by a camera in free motion and performing postprocessing such that the resulting image shows a non-flat structure.

Figure 8:
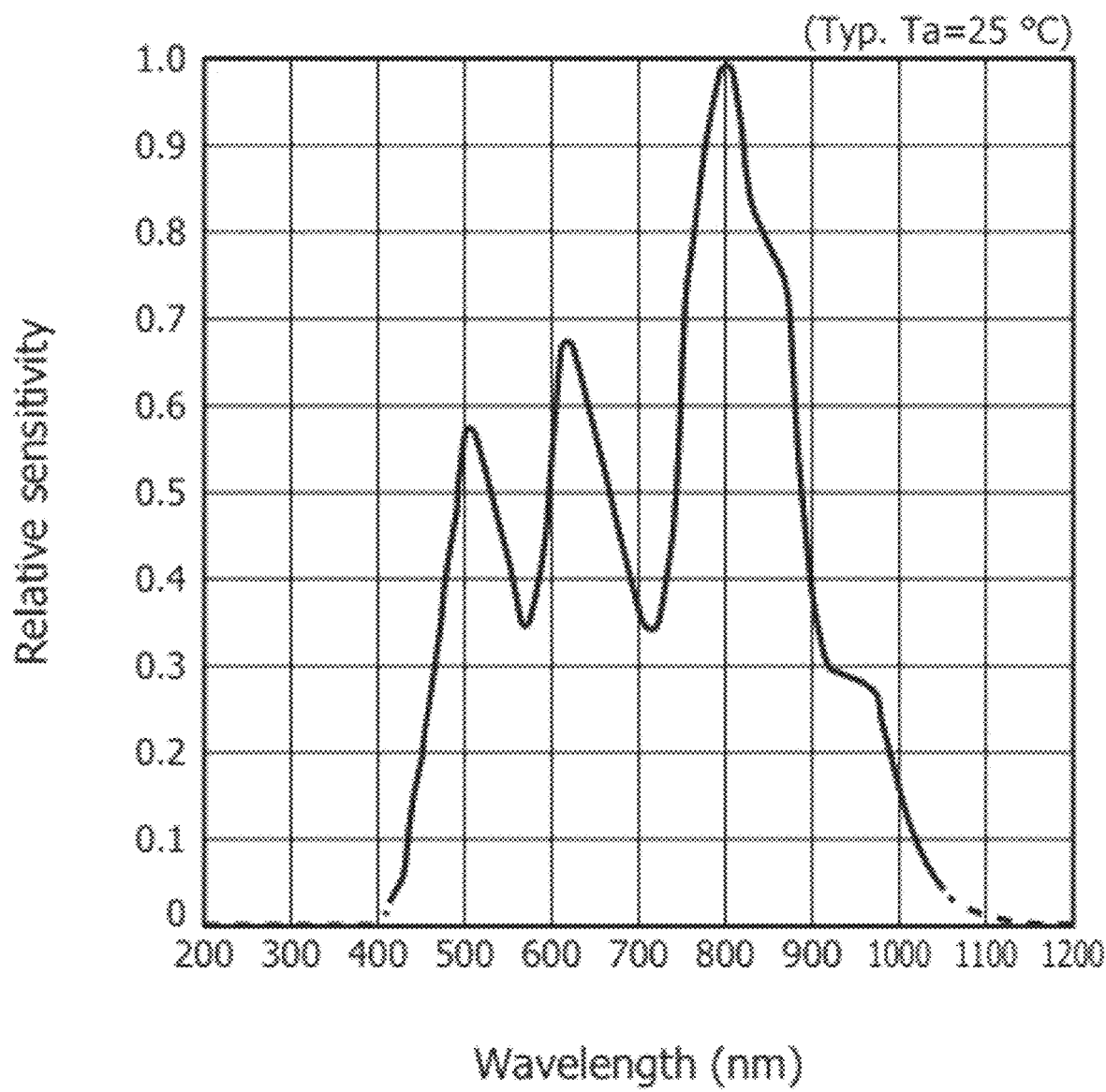
FIG. 8 is a graph of relative sensitivity as a function of wavelength for an example time-of-flight (TOF) sensor.

In some examples, the apparatus and methods disclosed herein can be utilized for measurement of underwater depth of lake or ocean floors. Cameras 60 may be configured for direct acquisition of bathymetry, or underwater depth of the ocean floor, including locating peaks and valleys and regions of flat terrain. For bathymetry or micro-bathymetry analysis, the one or more cameras 60 may be replaced with one or more time-of-flight (TOF) sensors, such as, for example a Hamamatsu S11963-01CR sensor. This device may simultaneously acquire a 160×120 array of distance measurements. The spectral response of the sensor (FIG. 8) may be configured for use with a green laser for illumination, whose light is only weakly absorbed by water.

The more than 100% coverage of the area of interest can be achieved for any reasonable camera footprint—its size requires only proper adjustment of rotational and linear speeds. Structurally, the set of cameras 60 may include 2, 3, 4, 5, 6, or more cameras. For a given set of cameras 60, if more cameras 60 are provided slower rotational speeds may be realizable. If fewer cameras 60 are provided, then a faster rotational speed would be required to capture images covering the same region.

Figure 7:
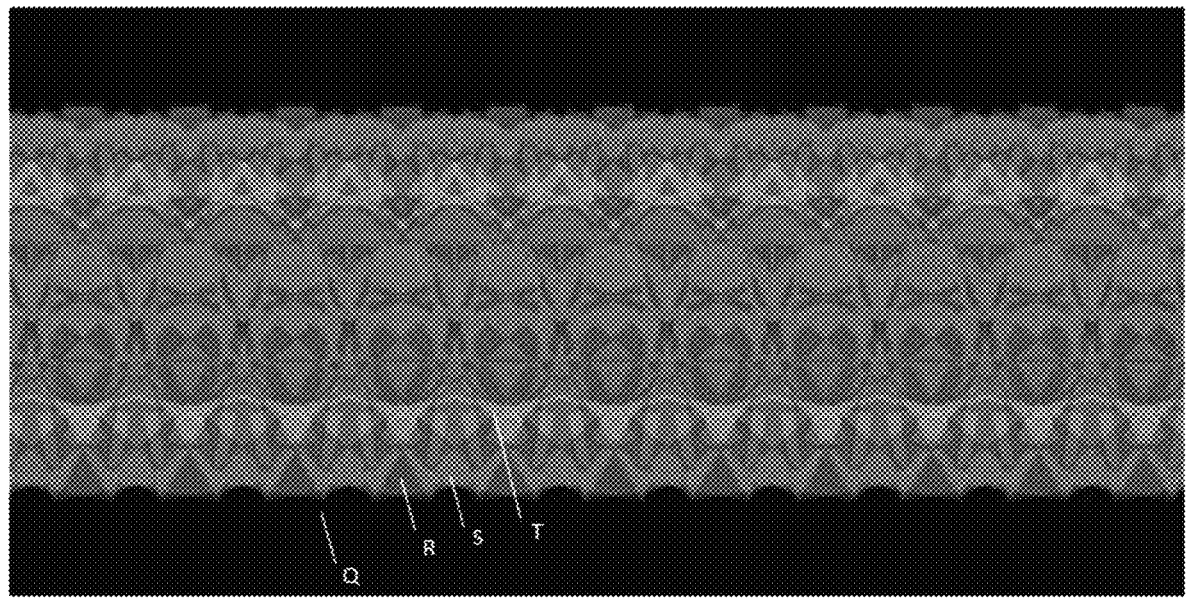
FIG. 7 is an intensity map showing coverage of the imaged swath, in one example of the disclosure.

FIGS. 6-7 are the result of simulations with certain parameters fixed (elevation, field of view, rotational speed, number of cameras). FIG. 6 shows the linear path 55 of motor 50 and rotational trajectories 65 of cameras 60 at the ends of the arms 70. FIG. 7 shows the corresponding coverage of the imaged swath. Black areas (Q) are not imaged, dark gray (R) indicates less covered areas, and medium gray (S) indicates areas that are more covered. Areas that are imaged most (up to 14 times for this example) are shown in light gray (T).

Figure 4:
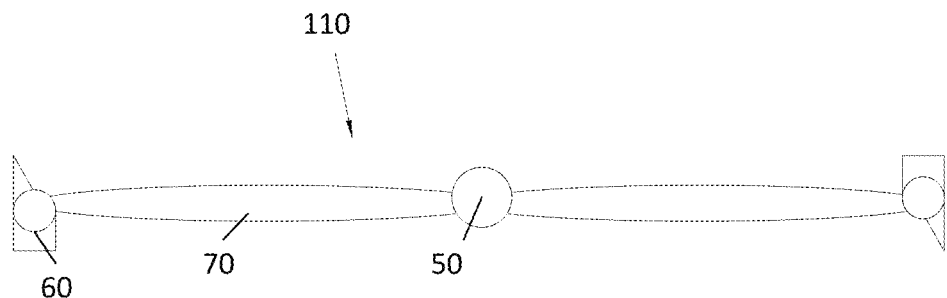
FIG. 4 is a top view of an example structure of a hydrodynamic design of an image collection device, in one example of the disclosure.
Figure 5:
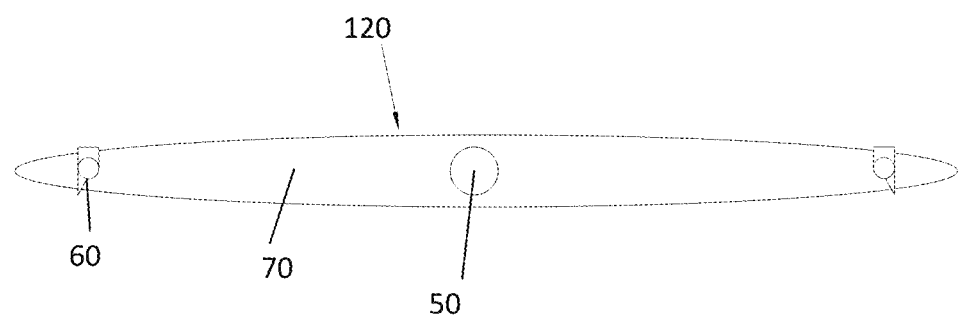
FIG. 5 is a top view of an example structure of a hydrodynamic design of an image collection device, in one example of the disclosure.

FIG. 7 details overlap created in an example imaged swath. The imaged swath width is theoretically unlimited—it is determined by the arm length. However, in practice, the weight of the arm 70 and camera housings and their drag may limit the swath width. To minimize the drag and to avoid turbulence, component housings may be provided with a hydrodynamic design. For example, the arms 70 connecting the cameras 60 to the motor 50, the motor 50 itself, and the cameras 60 may be provided with curved surfaces, may be formed in a disc shape, and/or may be rounded to limit potential drag and/or turbulence. FIGS. 4-5 illustrate alternate examples illustrating apparatus 110 and 120, respectively, showing some example hydrodynamic designs which provide curvature to arms 70.

The arm 70 with cameras 60 at the ends may be replaced with a solid disk that may be heavier than the arm 70 but has a number of advantages. First, the solid disk has a reduced drag than the arm 70 while rotating. Second, the solid disk allows for mounting more than two cameras 60 along its edge. The latter guarantees larger than 100% coverage with faster linear speed.

The motor may be handheld as the rotating arm 70 has properties similar to a gyroscope and once it starts to rotate, it tends to stay in the same plane of rotation. However, it may be mounted on a self-propelling platform that helps to keep the motor in a vertical position with little corrections from a diver and helps to maintain almost constant linear speed. The whole device may also be mounted on a vehicle, such as ROV or AUV.

One advantage of the proposed device is that, in some examples, a survey exploiting this device can be successfully performed by non-trained personnel. The proposed device eliminates the need to lay ropes or other markers on the seafloor. The proposed device eliminates the need to devise a mission plan for an AUV. When the surveyed area size exceeds the swath covered in one transect and there is still a need to employ the lawnmower pattern, there are less tough restrictions on the accuracy of the path in the opposite direction. More specifically, the proposed device is configured to compensate by matching non-sequential images as well as sequential images to form an accurate mosaic.

In the apparatus of the present disclosure, a relationship exists between linear speed of the motor, rotational speed of the arms 70 extending from the motor, field of view of the one or more cameras 60, length of the arms 70, or diameter of the disc, altitude of the camera 60 above the surface being imaged. For example, when the linear speed is low, rotational speed can also be low. However, for higher linear speeds, the rotational speed would need to be higher or more cameras 60 would need to be added to the system to cover the same area.

Coverage of the surveyed area using the apparatus and method described herein may depend on parameters including positional elevation above the area to be imaged, vertical field of view (FOV), rotational speed, and number of cameras. The vertical field of view of the camera $FoV_v$ (degrees) may be in the range of 30 degrees to 50 degrees, 35 degrees to 45 degrees, or 37 degrees to 42 degrees. The rotational speed $v_r$ may be in the range of 0.1 revolutions per second to 2 revolutions per second, 0.7 revolutions per second to 1.7 revolutions per second, or 1.0 revolutions per second to 1.5 revolutions per second. The number of cameras $N_c$ may be in the range of 1 camera to 6 cameras. Variations in these ranges may also result in effective system performance.

Image or data acquisition would need to occur at a rate which is fast enough (i.e. a sufficiently short time period between sequential snapshots) to support a system configured to provide gap free image or data acquisition. For a given time period between sequential snapshots, the maximum linear speed of the device can be estimated as:

$$V_{linear} \leq 2H v_r N_c \tan(FoV_v/2)$$

The above formula provides the upper limit of the linear speed that guarantees that there will be no gaps in detected area. Substituting typical values of parameters, maximum linear speed of the motor may lie in the range from 0.5 m/s to 112 m/s. Maximum linear speed for any given example may depend on hardware, water clarity, or other factors. Note that maximum linear speed does not depend on the length of the arm, the distal end of which supports and connects the one or more cameras. However, linear speed, which may be limited by potential drag, determines the width of the swath imaged by a single pass of the device. For a specific set of hardware and survey conditions, the maximum linear speed may be determined by simulation, which may also provide information about overlapping non-sequential frames.

Taking into account the frequency of snapshots would yield a more complex version of the formula for determining maximum linear speed.

To provide some insight into the dependence of area coverage on important parameters such as rotational speed, linear speed, size of area to be imaged, and snapshot period, FIGS. 6-7 and FIGS. 9-11 provide example results of simulations. A given image is assumed to have a 4:3 aspect ratio, footprint height is equal to 0.6 of the arm length. Note that footprint height is related to the altitude and the field of view:

$$h = 2H \tan(FoV_v/2)$$

Figure 9:
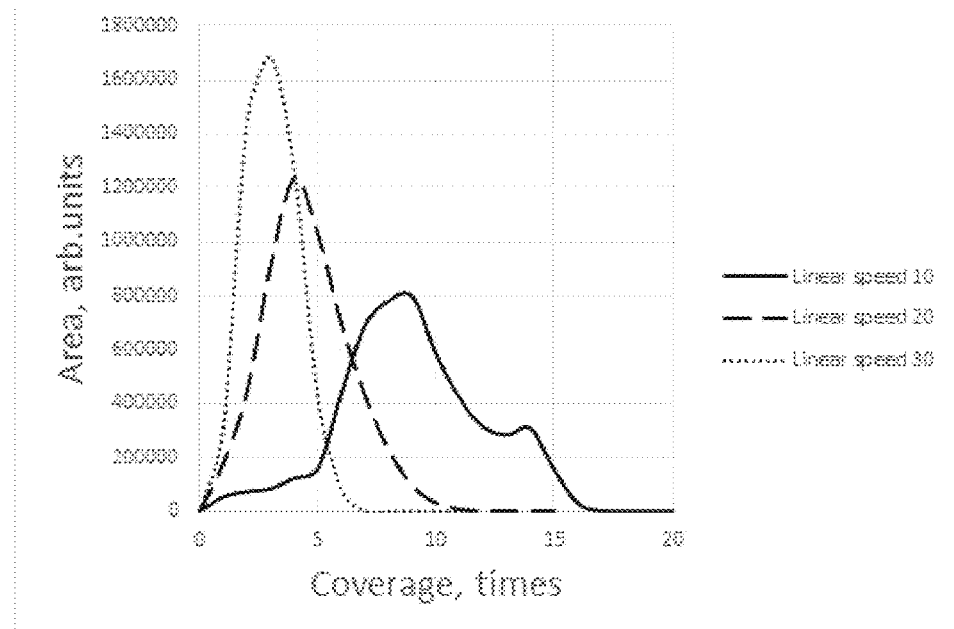
FIG. 9 is a graph of area coverage for different linear speeds, in accordance with one example of the disclosure.
Figure 10:
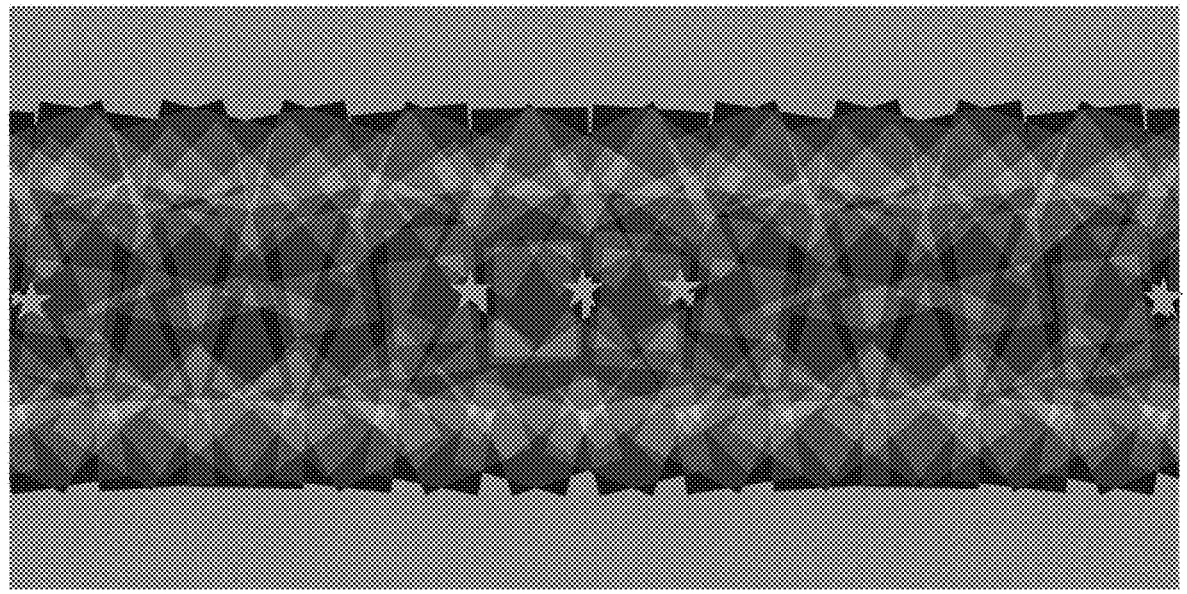
FIG. 10 is an intensity map showing area coverage of the imaged swath, in accordance with one example of the disclosure.
Figure 11:
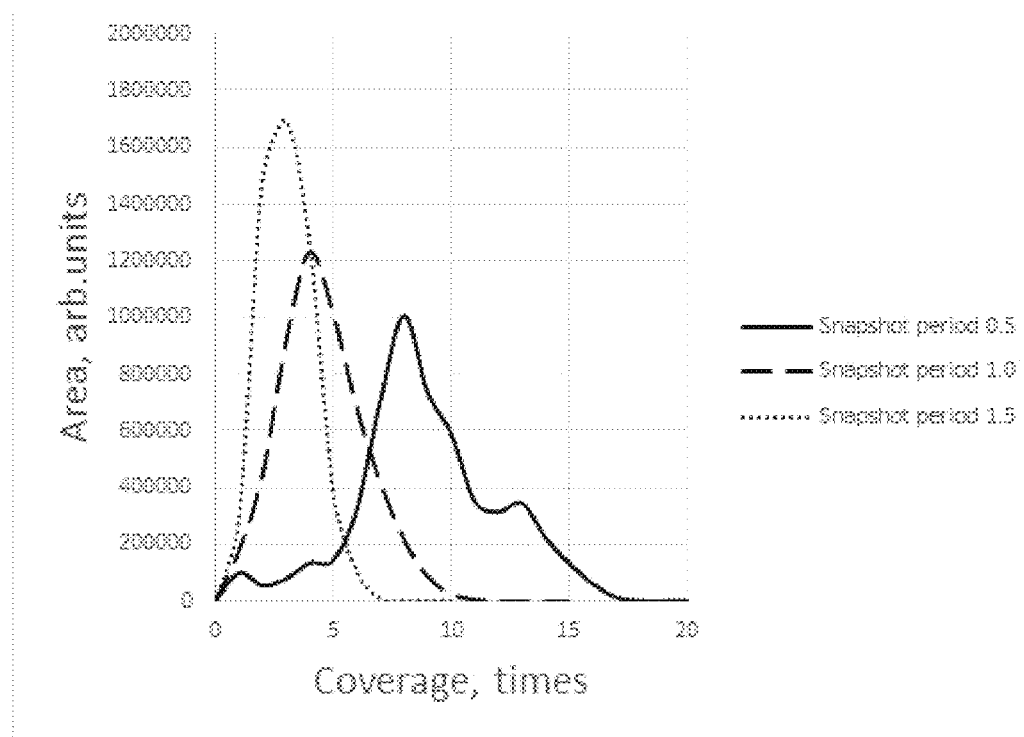
FIG. 11 is a graph of area coverage for different snapshot periods, in accordance with one example of the disclosure.

FIGS. 9-11 are the result of simulations with most of the parameters (elevation, field of view, rotational speed, number of cameras) fixed. FIG. 9 illustrates that for higher relative linear speed, imaged area coverage is relatively lower. For lower relative linear speed, imaged area coverage is relatively higher. For a linear speed of 10 m/s, for example, almost all covered area is being imaged between 5 to 15 times. For higher linear speeds of about 30 m/s, coverage becomes thinner. For linear speeds of about 32 m/s and higher, gaps start to appear in the imaged swath.

FIG. 10 shows central portions of the imaged swath highlighted with stars as well as jagged edges of the imaged swath, both of which indicate gaps in detected regions of the imaged swath. FIG. 10, represents a simulation indicating the presence of gaps in the imaged area at linear speeds of about 32.5 m/s.

FIG. 11 illustrates that for a longer relative snapshot period, the imaged area coverage is relatively lower. For a shorter relative snapshot period, the imaged area coverage is relatively higher. Snapshot period is defined herein as the time between snapshots taken by a camera. Thus, shorter snapshot periods make coverage denser, while longer snapshot period make coverage thinner. Even longer snapshot periods may lead to the appearance of gaps in the imaged swath.

Figure 12:
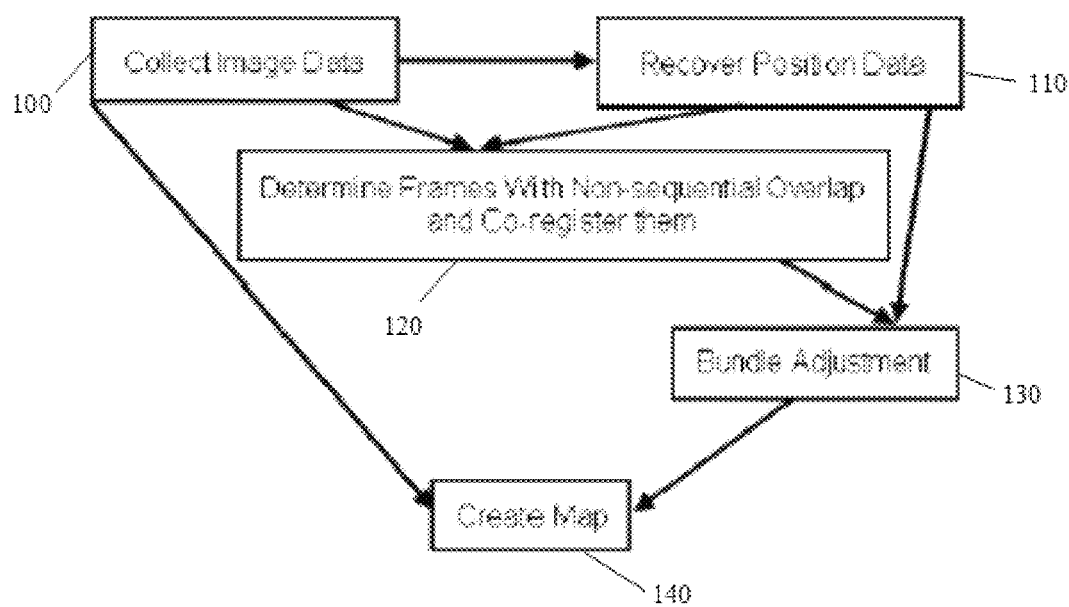
FIG. 12 is a flow diagram illustrating an example work flow, in accordance with one example of the disclosure.

FIG. 12 details an example work flow which can be performed by the device shown in FIG. 3, for example. In step 100, image data is collected. In step 110, position data is recovered for each image. Camera positions are recovered based on the content of images with overlapping footprints (non-sequential overlap). In step 120, frames are determined with non-sequential image overlap and these images are co-registered. In step 130, bundle adjustment is performed by a processor, utilizing both image data and position data. The bundle adjustment step allows for minimization of errors accumulating in the process of consecutive adding of frames to the map. Given a set of images depicting a number of 3D points from different viewpoints, bundle adjustment can be defined as the problem of simultaneously refining the 3D coordinates describing the scene geometry, the parameters of the relative motion, and the optical characteristics of the one or more cameras employed to acquire a set of images. Bundle adjustment may be employed as a last step in a feature-based reconstruction algorithm. In step 140, a map is created using processed image data corresponding to a set of locations.

Figure 13:
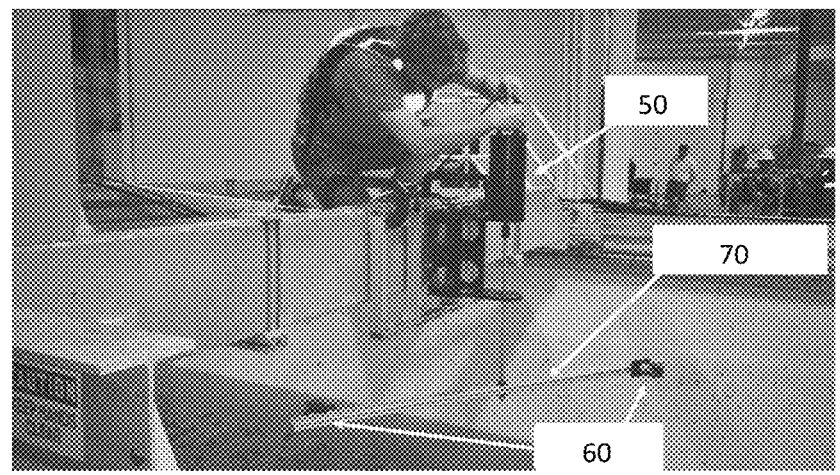
FIG. 13 is a perspective view of an example of an experimental setup for demonstrating proof of concept, in accordance with one example of the disclosure.

FIG. 13 illustrates an example of an experimental setup wherein a pair of cameras 60 are positioned one at each end of arms 70. Motor 50 is connected to a moving platform 90 via vertically extending shaft 80. Arms 70 extend horizontally from shaft 80. Arms 70 are positioned roughly parallel to the surface to be imaged. In the experimental setup shown in FIG. 13, moving platform 90 is set up to move at a controlled linear speed. The experimental setup shown in FIG. 13 is equivalent to an AUV or RUV moving at a controlled linear speed underwater. Cameras 60 are set up to rotate at a rate of 6 rotations/minute. Linear motion of the moving platform 90 in combination with the rotation speed of 6 rotations/minute resulted in non-sequential overlap which was sufficiently high to produce a near-guaranteed absence of gaps in coverage. Registration of only sequential frames resulted in the recovered camera positions shown in FIG. 15.

Figure 14:
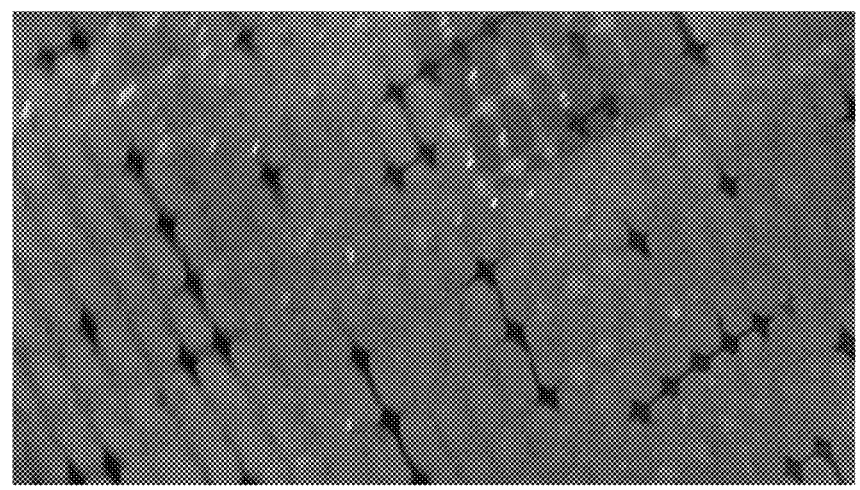
FIG. 14 is a top view of an example surface to be imaged provided with a pseudorandom visual pattern, in accordance with one example of the disclosure.

FIG. 14 illustrates an example surface to be imaged provided with a pseudorandom visual pattern. A pseudorandom pattern of black and white regions is painted on mesh safety fencing. Detection of images of the fence containing the pseudorandom pattern allows for easier registration of one image with another. FIG. 14 represents a typical frame acquired by a camera shown in FIG. 13, for example. It should be noted that detection of such a surface underwater should account for the fact that some warping may occur in the mesh layer due to underwater fluctuations.

Figure 15:
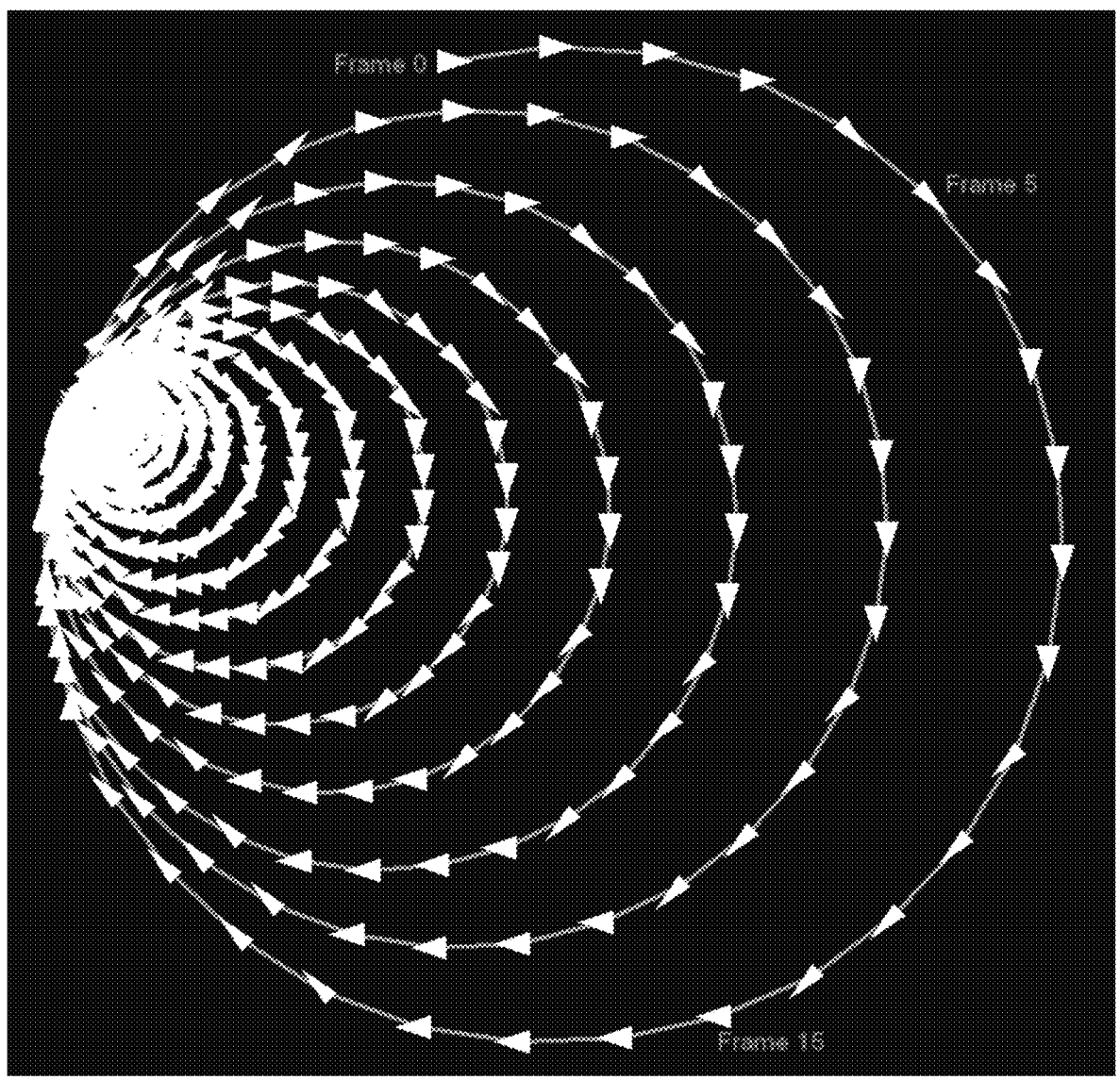
FIG. 15 is a top view of an example set of recovered camera positions following only sequential registration, in accordance with one example of the disclosure.

In FIG. 15, a top view of an example set of recovered camera positions following sequential registration only is depicted. Some frames are marked for clarity. It can be seen that some camera tilt did exist as a result of the converging camera positions over time. Non-perpendicularity of the optical axis of camera 60 and non-perpendicularity of the imaged surface contribute to these artifacts. Application of the SLAM technique described herein compensates for the accumulating error in positioning. To accomplish this, registration, or image matching, of non-sequential frames is necessary. It was found that the maximum non-sequential overlap is achieved for pairs of frames separated by 31-32 frames. After the registration of such pairs of frames and global optimization, camera positions were corrected, as shown in FIG. 16.

Figure 16:
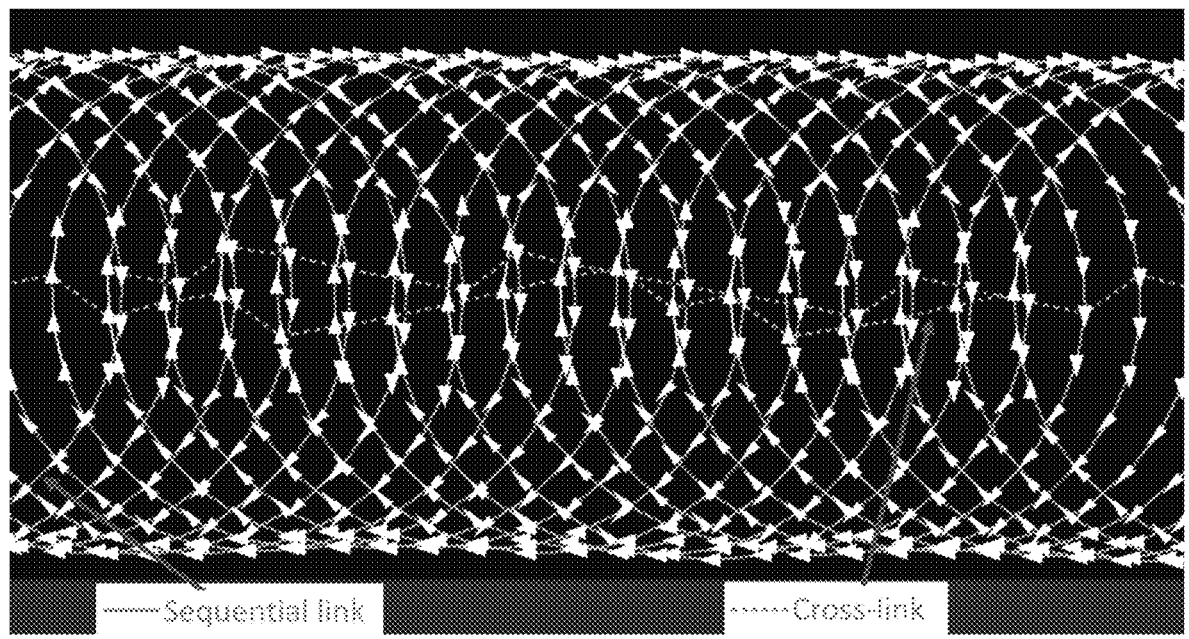
FIG. 16 is an example set of camera positions following correction after non-sequential registration of frames and global optimization, in accordance with one example of the disclosure.

FIG. 16 illustrates the set of camera positions from FIG. 15 following correction after non-sequential registration of frames and global optimization. In FIG. 16, solid lines indicate links between sequential frames (sequential link) and dotted lines indicate links between non-sequential frames (cross-link).

Figure 17:
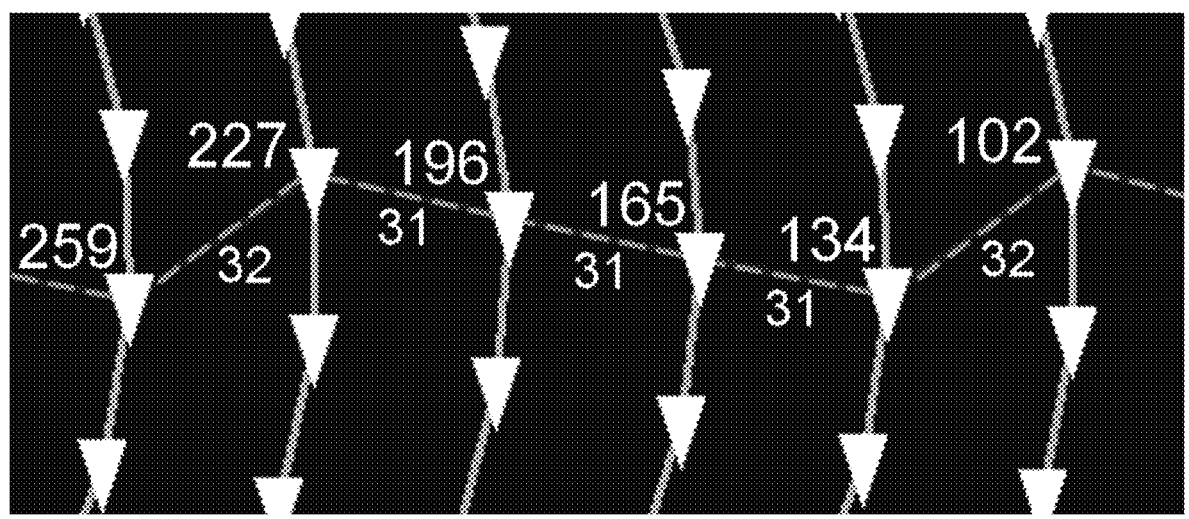
FIG. 17 is a close up view of FIG. 14 further indicating marked frame position numbers, in accordance with one example of the disclosure.

FIG. 17 illustrates a close up view of FIG. 16 further indicating marked frame position numbers, indicating that for the example shown here, it was either at frame 31 or frame 32 that non-sequential overlap occurred. Numbers listed above the dotted line indicate frame numbers and numbers listed below the dotted line indicate the difference between frame numbers for a given non-sequential overlap. Maximum overlap is achieved, in this example, between frames with numbers separated by 31 or 32 frames.

Figure 18:
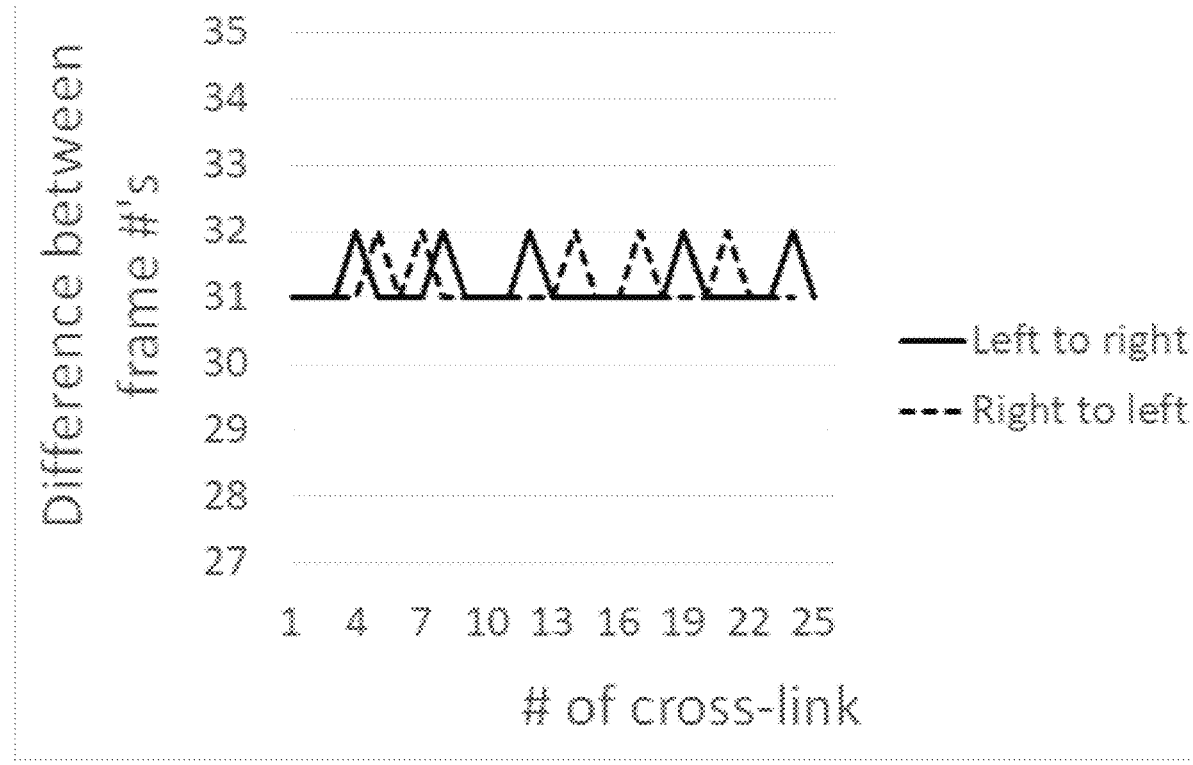
FIG. 18 is a graph of the difference between frame numbers and the number of the cross link illustrating the predictability of maximum overlap for 25 non-sequential registrations, in accordance with one example of the disclosure.

FIG. 18 illustrates that the predictability of overlap is very high. Maximum overlap for 25 non-sequential registrations was achieved between frame 31 or frame 32. This is consistent when looking either from left to right or right to left (i.e. either from low frame numbers to high frame numbers or from high frame numbers to low frame numbers).

It is important to note that the system and methods described herein provide for high predictability of non-sequential overlap without the use of manual markers placed in a region to be imaged. The high image overlap provided by the system described herein allows for predictable guaranteed non-sequential overlap for future captured frames once the first non-sequential overlap has been identified.

Figure 19:
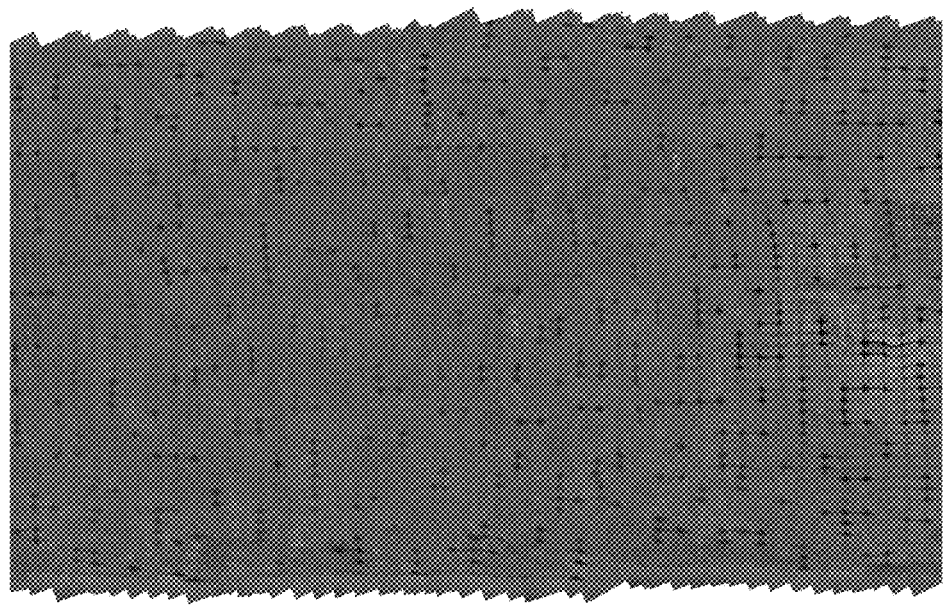
FIG. 19 is an example mosaic following optimization using methods herein described, in accordance with one example of the disclosure.

Following global optimization utilizing SLAM and non-sequential image overlap, a full mosaic from all frames can be built. In the proof of concept, about 750 frames were captured. FIG. 19 illustrates a portion of the full reconstructed mosaic resulting from the optimization using the system and methods herein described. This example mosaic was reconstructed from approximately 600 frames.

Improved Image Overlap and Map Quality

Functionally, the apparatus described herein is configured to detect images using a central motor 50, a set of arms 70 extending from the central motor, and one or more rotating cameras 60 or sensors fixed to the set of arms 70. The apparatus 10 is configured to detect, or image, an area. The apparatus 10 is configured to provide improved image overlap of the predetermined region of interest as compared to conventional systems. The apparatus 10 is configured to minimize missing portions of the region to be mapped or analyzed. The apparatus 10 described herein is configured to provide improved image overlap and thereby provide a more complete and higher quality map of a predetermined region of interest.

In some examples, super-resolution techniques may be employed during image acquisition. Super-resolution techniques may enhance the resolution of the imaging system. For example, in some examples, a given sensor may use both optics and ultrasound for detection of a predetermined region of interest. In some examples, optical super resolution may be employed to transcend the diffraction limit of the system. Optical super resolution may involve substituting spatial-frequency bands, multiplexing spatial-frequency bands, use of multiple parameters within a traditional diffraction limit, and/or probing of a near-field electromagnetic disturbance.

In some examples, geometrical super resolution may be employed to enhance the resolution of digital imaging sensors. Geometrical super resolution may involve multi-exposure image noise reduction, single frame deblurring, and/or sub-pixel image localization. Multiple images of the same scene allow one to apply super resolution techniques that result in images with resolution higher than the original ones. In some examples, radar and sonar imaging may be enhanced using substance decomposition-based methods and compressed sensing-based algorithms. Super resolution techniques are configured generally to improve resolution of the resulting reconstructed map.

In some examples of the present disclosure, a computer is provided for processing received images and associated image locations. The computer may be configured to construct or update a map of an unknown environment.

Underwater Positioning Systems

Underwater, two approaches may be utilized which track underwater vehicles using acoustics to determine positioning. In the long baseline (LBL) approach several transponders are placed in an area of interest, or worksite, to be mapped. In some examples, a network of sea-floor mounted transponders may be used as reference points for navigation. Transponders may be placed around the perimeter of a worksite. The LBL technique enables matching the location of each image with high accuracy. Accuracy is generally better than 1 meter and can reach a few centimeters accuracy. Positional accuracy and position stability may be independent of water depth.

In the long baseline approach, the position of an AUV or ROV can be determined by acoustically measuring the distance from the AUV or ROV to three or more seafloor deployed baseline transponders. Range measurements may be supplemented by depth data from pressure sensors on the transponders. Range measurements may be used to triangulate the positioning of the underwater vehicle.

In some examples, a vehicle mounted interrogator (A) may send a signal, which is received by a set of baseline transponders (B, C, D). Vehicle mounted interrogator (A) may send a signal at a given frequency X and receive a signal at a given frequency Y1, Y2, and Y3, for example, from each of baseline transponders (B, C, D), respectively. A distance (d) and position of the vehicle from each baseline transponder may be calculated using time for each signal to reach the vehicle from each baseline transponder according to d=v*t, where velocity (v) is the speed of sound, approximately 1500 m/s. The speed of sound may vary depending on temperature, salinity, and even sound frequency. Calculated positions may be relative to the location of the baseline transponders. Positions may be converted to a geo-referenced coordinate system such as latitude/longitude or UTM (universal transverse Mercator) if geo-locations of the baseline stations are first established.

LBL may provide advantages over alternative positioning systems as alternative measurement systems, such as ultra-short baseline (USBL), use shorter baselines where range disturbances of a given amount can result in much larger position errors.

In some examples, the USBL approach may be used to track image position. Ultra-short baseline is an alternative method of underwater acoustic positioning. In USBL, a transceiver may be mounted to a transceiver on a pole under a ship and a transponder may be mounted on the seafloor or on a vehicle, such as an ROV or AUV. A computer may be used to calculate a position from the ranges and bearings measured by the transceiver.

An acoustic pulse may be transmitted by the transceiver and detected by the transponder, which then replies with an acoustic pulse of its own. The return pulse is detected by the transceiver aboard the ship. The time from the transmission of the initial acoustic pulse until the reply is detected is measured by the USBL system and is converted into a range.

To calculate subsea positioning, the USBL calculates both a range and an angle from the transceiver to the subsea transponder. The transceiver may contain an array of transducers for measuring received signal angle. A method called "phase-differencing" within the transducer array is used to calculate the direction to the subsea transponder.

Either the long baseline or ultra-short baseline approach for acoustic positioning may be used to supplement the system and methods described herein by providing position information for a given image. Positioning information from LBL is typically on the level of meters and from USBL is typically on the level of tens of centimeters. In particular, use of LBL or USBL approaches may be helpful for in cases where the proposed device is used with a boustrophodonic pattern to provide a rough alignment.

However, it is important to note that creation of a mosaic using the system and methods described herein is achievable with pixel level accuracy. Creation of a mosaic with millimeter or even sub-millimeter accuracy is achievable using the system and methods described herein. The system and methods described herein are configured to produce a seamless or near-seamless mosaic as a result of image processing techniques including bundle adjustment, non-sequential image overlap, global optimization, and utilizing the SLAM approach.

What is claimed is:

1. An apparatus for image collection, comprising:
   an underwater vehicle, comprising
      a central motor comprising a rotating member;
      a set of arms coupled to the rotating member and extending away from the central motor; and
      one or more cameras attached to a distal end of at least one arm of the set of arms, wherein the underwater vehicle is configured to travel over a predetermined region and collect a set of images of the predetermined region,
      wherein the set of arms form an elongated bar, wherein the central motor is integrated into the elongated bar.

2. The apparatus of claim 1, further comprising a processor configured to create a full mosaic image using non-sequential image overlap.

3. The apparatus of claim 1, wherein at least one of the central motor, the set of arms, and the one or more cameras is provided with rounded edges to facilitate hydrodynamic motion.

4. The apparatus of claim 3, wherein the set of arms is housed within a disc.

5. The apparatus of claim 1, wherein the underwater vehicle is configured to utilize a long baseline (LBL) approach to determine positioning for each imaged location in the predetermined region.

6. The apparatus of claim 1, wherein the underwater vehicle is configured to utilize an ultra-short baseline (USBL) approach to determine positioning for each imaged location in the predetermined region.

7. The apparatus of claim 1, wherein the distal end is a terminal end.

8. The apparatus of claim 1, wherein each arm of the set of arms is configured to rotate in a plane parallel to a region of interest.

9. An apparatus for collection of images, comprising:
   an underwater vehicle comprising
      a central motor; and
      a set of sensors configured to rotate about the central motor,
      wherein at least one sensor of the set of sensors is attached to an end of at least one arm of a set of arms, wherein the set of arms form an elongated bar, wherein the central motor is integrated into the elongated bar,
      wherein the underwater vehicle is configured to travel over a linear path in a predetermined region and detect information in the predetermined region.

10. The apparatus of claim 9, wherein the set of sensors are a set of time-of-flight (TOF) sensors.

11. The apparatus of claim 10, wherein the information is bathymetry information.

12. The apparatus of claim 9, wherein the set of sensors are a set of cameras.

13. The apparatus of claim 12, wherein the set of cameras are rotated at a constant rotational speed.

14. The apparatus of claim 9, wherein at least one of the set of sensors and the central motor are housed within a disc.

15. A method, comprising:
    driving an underwater vehicle at a constant linear speed;
    rotating one or more cameras about a central motor,
       wherein at least one camera of the one or more cameras is attached to an end of at least one arm of a set of arms, wherein the set of arms form an elongated bar, wherein the central motor is integrated into the elongated bar;

capturing a set of images of a region to be mapped; and detecting position of the underwater vehicle during image capture.

16. The method of claim 15, wherein the one or more cameras are coupled to a processor configured for image co-registration using non-sequential image overlap.

17. The method of claim 15, wherein the one or more cameras are rotated at a constant rotational speed.

18. The method of claim 15, wherein a long baseline (LBL) approach is utilized to detect position of the underwater vehicle in the region to be mapped.

19. The method of claim 15, wherein an ultra-short baseline (USBL) approach is utilized to detect position of the underwater vehicle in the region to be mapped.

20. The method of claim 15, further comprising sending the set of images to a computer.

21. The method of claim 20, further comprising performing a bundle adjustment step.

22. The method of claim 20, further comprising performing global optimization utilizing SLAM and non-sequential image overlap.

23. The method of claim 22, further comprising compiling the set of images into a map of the region.

* * * * *